United States Patent
Hamada

[11] Patent Number: 6,047,135
[45] Date of Patent: Apr. 4, 2000

[54] DRIVING MECHANISM FOR KEEPING FEEDBACK CYCLE CONSTANT, APPARATUS WITH THE MECHANISM, AND ITS CONTROL METHOD

[75] Inventor: Satoshi Hamada, Habikino, Japan

[73] Assignee: Minolta Co., Ltd., Osaka, Japan

[21] Appl. No.: 09/196,929

[22] Filed: Nov. 20, 1998

[30] Foreign Application Priority Data

Nov. 21, 1997 [JP] Japan ..................... 9-321609

[51] Int. Cl.⁷ ............... G03B 17/00; H01L 41/04
[52] U.S. Cl. ........................... 396/55; 310/317
[58] Field of Search ............... 396/55, 248, 261; 310/317, 316; 318/594, 135

[56] References Cited

U.S. PATENT DOCUMENTS

| | | | |
|---|---|---|---|
| 5,130,729 | 7/1992 | Sato et al. | 396/55 |
| 5,587,846 | 12/1996 | Miyano et al. | 310/317 X |
| 5,768,016 | 6/1998 | Kanbara | 396/55 X |
| 5,783,899 | 7/1998 | Okazaki | 310/317 |
| 5,907,212 | 5/1999 | Okada | 310/317 X |
| 5,917,267 | 6/1999 | Miyazawa et al. | 310/317 X |

FOREIGN PATENT DOCUMENTS

| | | |
|---|---|---|
| 0-747977 | 5/1996 | European Pat. Off. . |
| 5-216318 | 8/1993 | Japan . |
| 6-037642 | 2/1994 | Japan . |
| 2508250 | 5/1996 | Japan . |
| 9-205788 | 8/1997 | Japan . |

*Primary Examiner*—W. B. Perkey
*Attorney, Agent, or Firm*—Sidley & Austin

[57] ABSTRACT

A driving device, for driving a compensation lens of a camera, with a feedback control for an actuator therefor in which it is easy to keep a feedback cycle constant. In the feedback control, the feedback cycle is kept constant by counting the number of PWM pulses for driving the actuator. In case that the actuator is of a type in which it is controlled by more than one PWM pulse trains with different phases, one pulse train with predetermined phase is continuously supplied to the actuator even when the actuator is not driven, where the number of pulses in the one pulse train is counted so as to keep the feedback cycle constant. The actuator preferably employs a piezoelectric element which expands and contracts in response to a wave-form pulse included in the PWM pulse train.

14 Claims, 13 Drawing Sheets

DRIVING MECHANISM FOR KEEPING FEEDBACK CYCLE CONSTANT, APPARATUS WITH THE MECHANISM, AND ITS CONTROL METHOD

This application is based upon application No. 09-321609 filed in Japan, the contents of which are hereby incorporated by reference.

BACKGROUND OF THE INVENTION

1. Field of the Invention

The present invention generally relates to an apparatus, to a driving mechanism that is provided in the apparatus in which the driving mechanism drives a particular element or component, and to a method for controlling the driving mechanism, and particularly relates to an optical apparatus including, for example, a camera and a binocular telescope, to the driving mechanism that is provided in the optical apparatus in which the driving mechanism drives, for example, an optical element of an optical system therein so as to compensate or correct a possible blur, caused at time of handing the optical apparatus, of image formed in the optical system by a feedback control, and to the method for executing the feedback control.

2. Description of the Related Art

Generally, when a precise control to drive a particular element or component is required in a driving mechanism of an apparatus in which the driving mechanism is provided, it has been practiced to execute a feedback control. In order to accurately execute the feedback control, it is very important to keep constant a cycle for carrying out the feedback operation. More specifically, the cycle therefor is gained, for example, by counting the number of signals output from an encoder to detect an operation of the driving mechanism, or by generating signals which synchronize with driving pulses to drive the driving mechanism. Alternatively, in order to more accurately keep constant the cycle for carrying out the feedback operation, it is possible to gain the cycle therefor by separately or independently measuring time by making use of a timer installed inside a microcomputer for controlling the driving mechanism. However, in case that such a timer is employed therein for the purpose, the overall construction and/or the control operation thereof becomes complex.

As an example, the aforementioned apparatus can be an optical apparatus including a camera and a binocular telescope. The driving mechanism can be the one that is provided in the optical apparatus in which the driving mechanism drives. For example, the optical apparatus could be an optical element like a correction lens (compensation lens) or a prism of an optical system therein that compensates or corrects a possible blur, which is caused at time of handing the optical apparatus, of an image formed in the optical system by the feedback control.

For example, the driving mechanism moves the lens, which is the optical element in the optical apparatus, in a direction to cancel the blur of an image formed in the optical system. The blur is caused at time of handling the optical apparatus.

More specifically, an amount of shaking of the optical apparatus and/or an amount of blur of the image formed in the optical system is/are detected by a variety of sensors installed in the apparatus while a position of the optical element, like the lens, is detected at predetermined timing. Based upon a result gained from the detection, a driving speed of the driving mechanism is newly sought for or calculated to execute the feedback control operation.

Next, referring to FIGS. 1 through 3, the following description provides an explanation about a driving mechanism in which there is provided an actuator employing an electromechanical transducer, such as a piezoelectric element the length of which changes (i.e. expands and contracts) when a voltage is supplied to the piezoelectric element.

This driving mechanism has a moving body 10 which can be moved relative to a base seat (stationary base) 1. Therefore, in a construction in which the moving body 10 is coupled to, for example, a lens frame for holding the correction lens (compensation lens), the lens held by the lens frame can be moved together with the moving body 10.

A reference numeral 4 denotes a piezoelectric element. The piezoelectric element 4 is made up of a number of piezoelectric plates which are laminated one over another. One end 4a of the piezoelectric element 4, in a direction in which the piezoelectric element 4 expands and contracts, is fixed to the base seat 1, whereas the other end 4b thereof, in the same direction, is fixed to an end 5a of a rod 5. The rod 5 is slidably supported by a pair of support portions 2 and 3, which are formed integrally with the base seat 1.

The moving body 10 has a body 11 and a cap 12 which cooperate together to sandwich the rod 5. The moving body 10 further has a pressure cap 13 which exerts a biasing force in a direction in which the rod is pinched between the body 11 and the cap 12, so that the moving body 10 is frictionally and slidably engaged around the rod 5.

The piezoelectric element 4 is electrically connected to an actuator driving circuit. When the actuator driving circuit continuously supplies a predetermined varying pulse voltage, like one with a sawtoothed wave-form 100, 100', 100" as shown in FIG. 3, the piezoelectric element 4 expands and contracts (i.e. vibrates) which in turn vibrates the rod 5.

More specifically, in correspondence with a gently ascending slope portion 101 of a first wave-form of the pulse voltage supplied by the actuator driving circuit, the piezoelectric element 4 expands slowly so that the rod 5 also moves slowly in a direction shown by an arrow "A" in FIG. 2. Next, when the voltage is abruptly cut or reduced as shown by an abruptly falling cliff portion 102 of the first wave-form thereof, the piezoelectric element 4 abruptly contracts to return to its original length, so that the rod 5 also abruptly moves in a direction shown by an arrow "B" in the same figure.

When the pulse voltage is continuously applied to the piezoelectric elements 4 so that a plurality of waveforms 100', 100", and so on, similar in shape to the first wave-form 101 are repeated, the rod 5 vibrates so that it moves slowly in the direction shown by the arrow "A" and so that it moves rapidly in the direction shown by the arrow "B". The spring force of the pressure spring 13 of the moving body 10 (i.e. the frictional engagement force between the moving body 10 and the rod 5) is adjusted so that the moving body 10 moves together with the rod 5 relative to the base seat 1 as the rod 5 moves slowly, and so that the moving body 10 remains stationary, or moves a little bit, relative to the base seat 1 due to inertia of the moving body 10 as the rod 5 moves rapidly. Namely, while the rod 5 is vibrating as in the aforementioned manner, the moving body 10 moves in the direction shown by the arrow "A" relative to the base seat 1. Because the amplitude of the rod 5 during its vibration is very small, the amount of movement, relative to the base seat 1, of the moving body 10 corresponding to one pulse voltage (i.e. corresponding to each of the wave-forms 100, 100', 100", and so on) is also very small. Therefore, it is possible to control the position of the lens frame, holding the lens, that is connected to the moving body 10, with a high precision.

As a method for moving the moving body 10 in the direction shown by the arrow "B", opposite the direction shown by the arrow "A", in FIG. 2, an electric charge of the pulse voltage to be supplied to the piezoelectric element 4 can be reversed while maintaining the wave-form 100, 100', 100", and so on, of the voltage as shown in FIG. 3. With the application of the pulse voltage to the piezoelectric element 4, the piezoelectric element 4 slowly contracts for the gently ascending slope portion 101 of the wave-form of one pulse voltage, while the piezoelectric element 4 abruptly expands for the abruptly falling cliff portion 102 of the wave-form of the one pulse voltage to return to its original length of the piezoelectric element 4. The principle of movement of the moving body 10 in the direction shown by the arrow "B" is the same as the principle of movement of the moving body in the direction shown by the arrow "A" as explained above.

Next, the follwing description provides an explanation about how to compensate or correct a possible blur, which is caused at a time of handling the optical apparatus, of an image formed in the optical system of the apparatus. This compensation or correction is accomplished with the actuator in the driving mechanism and the actuator driving circuit explained above.

Generally, as explained above, it is of great importance to keep the feedback cycle constant in the feedback control. Accordingly, the feedback (i.e. application of a predetermined voltage to the piezoelectric element) must be executed every constant number of PWM (i.e. pulse-width modulation) pulses. That is, it is considered necessary to keep the feedback cycle constant, by independently or separately measuring time with a timer which is installed in a microcomputer.

Next, referring to FIGS. 8 and 9, the following description provides an explanation about how to carry out the feedback operation by an arrangement in which such a timer is installed in the microcomputer.

FIG. 8 illustrates an example in which the starting timing of the timer is synchronized with the PWM pulse (i.e. the starting point of the timer is made coincident with the starting point of the PWM pulse). For example, when the feedback operation is performed with a cycle corresponding to four PWM pulses as shown in the figure, the timer is set so that the timer will count up (i.e. the timer will stop measuring time) in a time shorter than the feedback period "4T" by a feedback processing time "ta", which is such a time required for the operation to actually change the actuator speed.

With the arrangement, the timer is started again so as to synchronize with the next PWM pulse, once after the feedback processing is done. This operation must be repeated every four PWM pulses corresponding to the feedback period "4T" as shown in the same figure. That is, the feedback control operation is complex, thus increasing the burden of the microcomputer other components.

Alternatively, FIG. 9 illustrates an example in which the starting timing of the timer is not synchronized with the PWM pulse (i.e. the starting point of the timer is not made coincident with the starting point of the PWM pulse). The timer is started earlier than the PWM pulse by the feedback processing time "ta".

In this arrangement, at time of starting the feedback control operation, it is necessary to calculate the time "ta" necessary for the feedback processing operation in advance, and to make the timer start earlier than the PWM pulse by the calculated time "ta". As a result, the control operation becomes complex at time of starting the feedback control, thus increasing the burden of the microcomputer other components, as well.

SUMMARY OF THE INVENTION

Therefore, it is an object of the present invention to provide a driving mechanism in which a control circuit construction for keeping a feedback cycle constant is simple.

It is another object of the present invention to provide an apparatus in which the control circuit construction for keeping the feedback cycle constant is simple.

It is still another object of the present invention to provide a feedback control method for simplifying the control program to keep the feedback cycle constant.

In accomplishing these and other objects of the present invention, according to one aspect thereof, there is provided a driving mechanism in which an actuator is driven by a plurality of pulses of pulse-width modulation (i.e. a plurality of "PWM" pulses), comprising: a counter for counting a number of the pulses; and a feedback circuit for executing a feedback on an operation of the actuator with a cycle which is determined on a basis of the number of the pulses counted by the counter.

The driving mechanism can be provided, for example, in an optical apparatus like a camera, and the actuator can be employed, for example, to drive a correction lens for compensating a blur of image that is formed in an optical system, including the correction lens, in which the blur may be caused while the camera is manually handled.

According to the construction, in order to execute the feedback upon the operation of the actuator, there is no need of providing any additional device; more specifically, for example, there is no need for counting the number of signals which are output from an encoder to detect the operation of the driving mechanism, and/or there is no need for calculating a feedback cycle by separately measuring time with a timer built in a microcomputer.

That is, according to the construction, the overall construction of the driving mechanism is simplified due to the simplification of the feedback control circuit for maintaining the feedback cycle.

According to another aspect of the present invention, there is provided an apparatus, comprising: a pulse generator for providing a plurality of pulses of pulse-width modulation; an actuator which is driven by the plurality of pulses thereof; a counter for counting a number of the pulses thereof; and a controller for executing a feedback on a provision of the pulses to the actuator with a cycle which is determined on a basis of the number of the pulses counted by the counter.

According to the construction, in order to execute the feedback upon the provision of the pulse to the actuator, there is no need for providing any additional device; more specifically, for example, there is no need for counting the number of signals which are output from an encoder to detect the operation of the driving mechanism, and/or there is no need for calculating a feedback cycle by separately measuring time with a timer built in a microcomputer.

That is, according to the construction, the overall construction of the apparatus is simplified due to the simplification of the feedback control circuit for maintaining the feedback cycle.

According to still another aspect of the present invention, there is provided a feedback control method for executing a feedback on an operation of an actuator which is driven by a plurality of pulses of pulse-width modulation, comprising the steps of: providing the actuator with the plurality of pulses thereof; counting a number of the plurality of pulses thereof provided for the actuator; and executing a feedback on a provision of the pulses provided for the actuator with a cycle which is determined on a basis of the number of the pulses counted.

According to the method, in order to execute the feedback upon the operation of the actuator, there is no need for providing any additional control program; more specifically, for example, there is no need for counting the number of signals which are output from an encoder to detect the operation of the driving mechanism, and/or there is no need for calculating a feedback cycle by separately measuring time with a timer built in a microcomputer.

That is, according to the method, the overall control of a driving mechanism, or of an apparatus in which the driving mechanism is provided, is simplified due to the simplification of the feedback control program for maintaining the feedback cycle.

According to still another aspect of the present invention, there is provided an apparatus comprising: an actuator with an electromechanical transducer which expands and contracts when a voltage is supplied to the transducer; a driving pulse voltage generator which has: a charging circuit part for giving an electric potential difference of the voltage to the transducer so that the transducer expands; and a discharging circuit part for releasing an electric potential of the voltage accumulated in the transducer so that the transducer contracts from a state in which the transducer expands, a driven part which is driven by the actuator; a pulse controller for controlling an expansion and a contraction of the transducer, by calculating a speed necessary for driving the driven part, by modulating a signal corresponding to the speed into a first pulse-width modulation train with a predetermined pulse cycle, by supplying the first pulse-width modulation train to the charging circuit part, and by supplying a second pulse-width modulation train with the predetermined pulse cycle to the discharging circuit part with a predetermined timing relative to the first pulse-width modulation train; and a counter for counting a number of pulses of the second pulse-width modulation train, wherein the pulses of the second pulse-width modulation train are kept outputting from the pulse controller regardless of driving/stopping of the actuator, and wherein the pulse controller executes a feedback on a provision of the pulses to the transducer with a preset cycle which is determined on a basis of the number of the pulses counted by the counter, so as to control the speed necessary for driving the driven part.

According to the construction, the feedback cycle is kept constant by counting the number of pulses of the second pulse-width modulation train supplied to the discharging circuit part even when the actuator is stopped or is not driven.

Namely, according to the construction, in order to execute the feedback upon the operation of the transducer, there is no need for providing any additional device; more specifically, for example, there is no need for counting the number of signals which are output from an encoder to detect the operation of the driving mechanism, and/or there is no need for calculating a feedback cycle by separately measuring time with a timer built in a microcomputer.

That is, according to the construction, the overall construction of the apparatus is simplified due to the simplification of the feedback control circuit for maintaining the feedback cycle.

BRIEF DESCRIPTION OF THE DRAWINGS

These and other objects and features of the present invention will become clear from the following description taken in conjunction with a preferred embodiment of the present invention and modifications to the embodiment thereof with reference to the accompanying drawings, in which.

DETAILED DESCRIPTION OF THE PREFERRED EMBODIMENT

Figure 1:
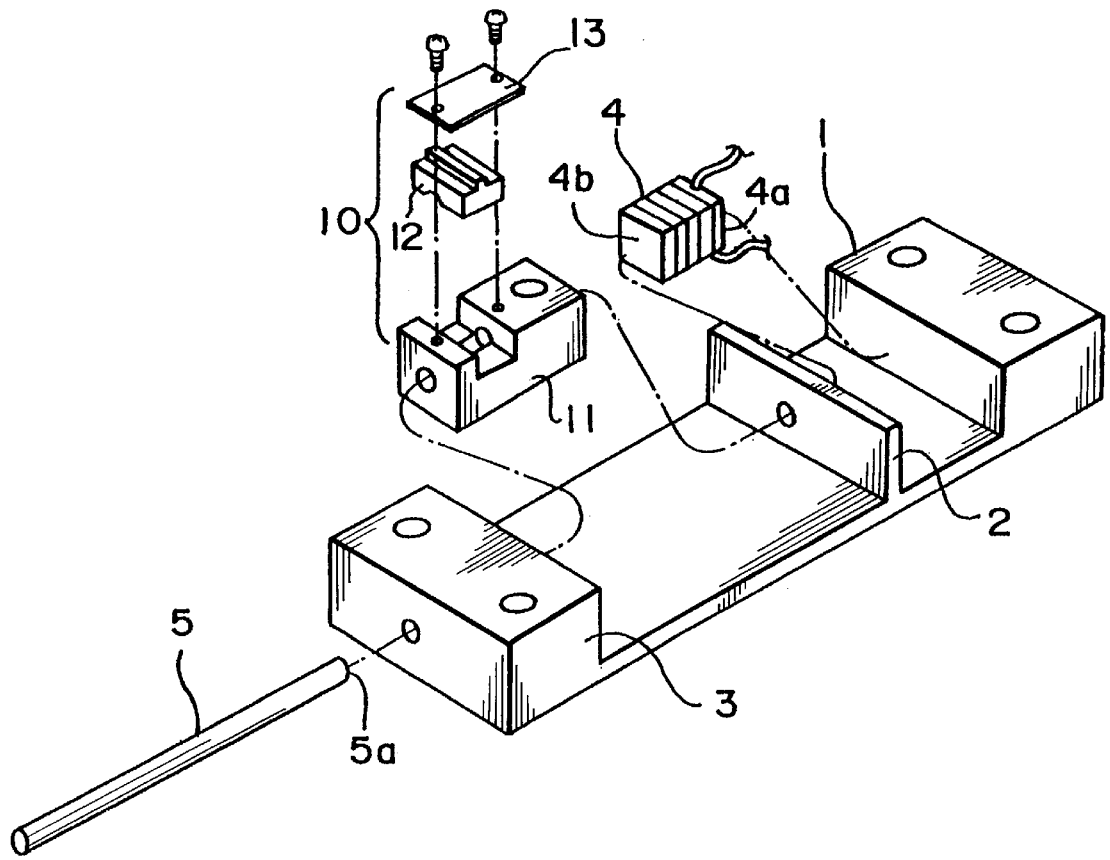
FIG. 1 is an exploded perspective view showing a conventional actuator employing a piezoelectric element.

Before the description of the preferred embodiment of the present invention and of the modifications to the embodiment thereof proceeds, it is to be noted that like or corresponding parts are designated by like reference numerals throughout the accompanying drawings.

Referring to FIGS. 4 through 15, a description is made below upon a camera, as one example, according to the preferred embodiment of the present invention, and to modifications thereto.

Figure 10:
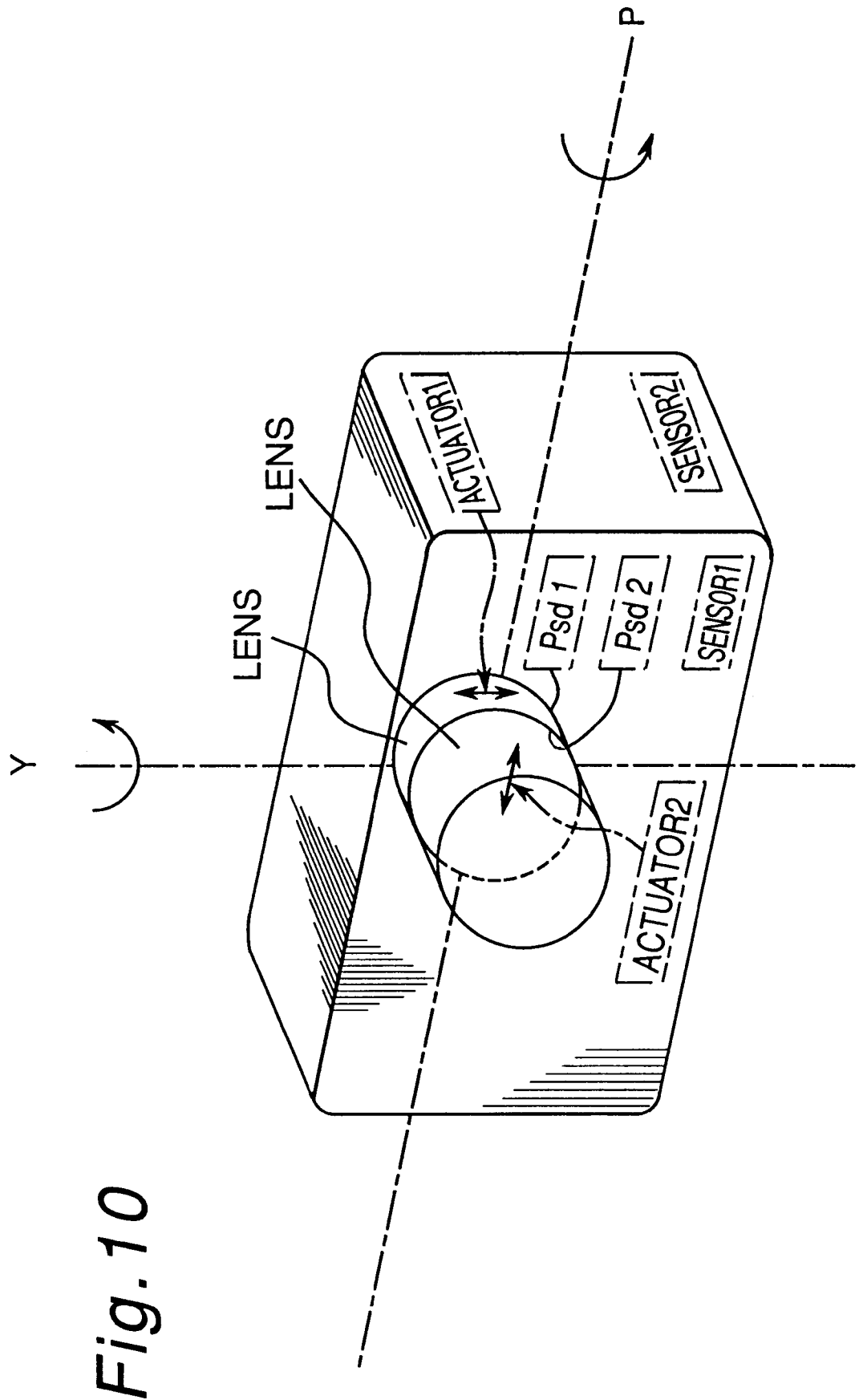
FIG. 10 is a perspective view of a camera according to a preferred embodiment of the present invention.

FIG. 10 illustrates the camera as an explanatory perspective view. In the figure, a reference letter "P" denotes a pitch axis of the camera, and "Y" denotes a yaw axis thereof. It will be explained below about how a possible blur around the pitch axis "P" and/or the yaw axis "Y", caused at time of handing the camera, of image formed in an optical system therein, is compensated or corrected.

Figure 11:
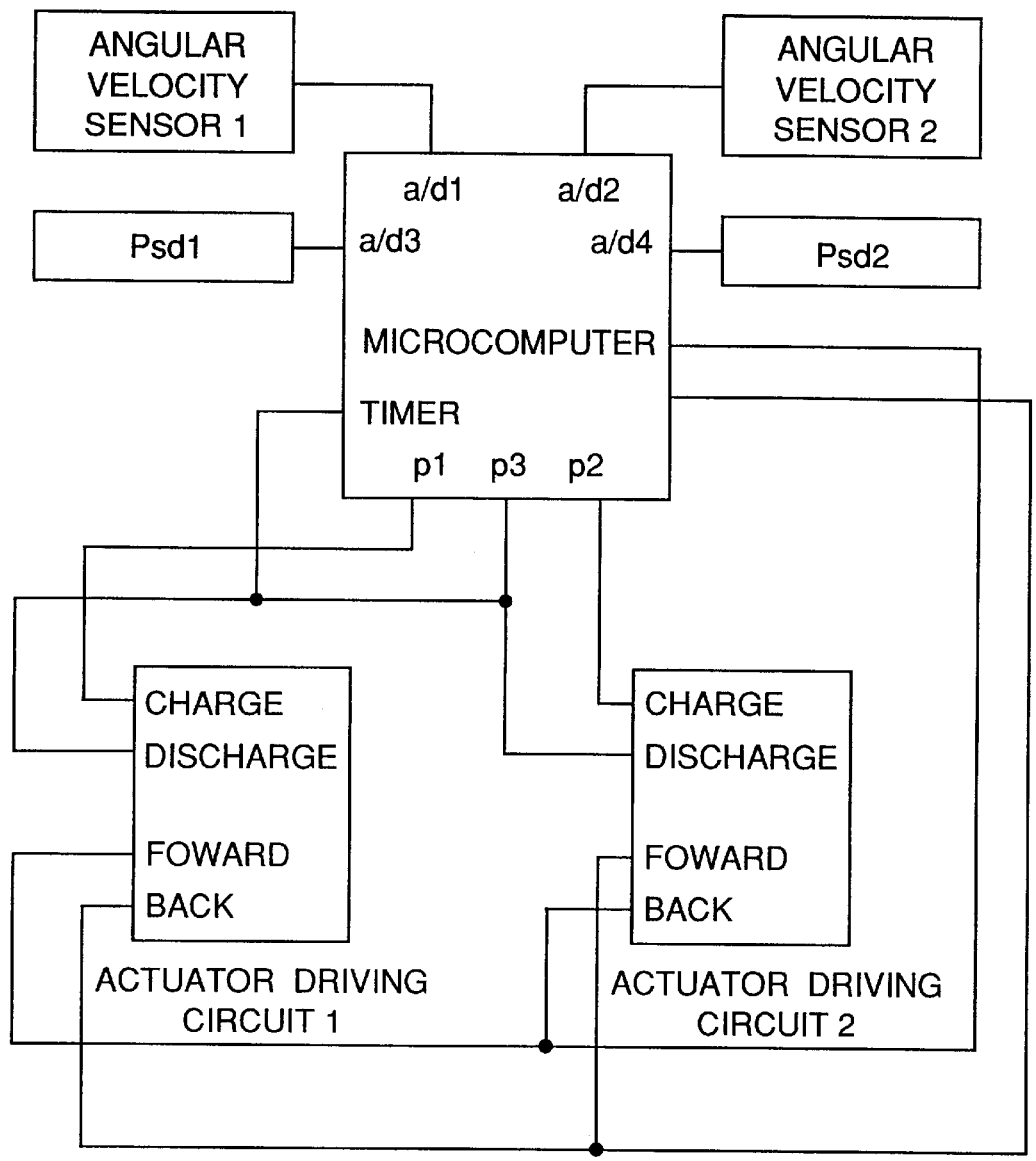
FIG. 11 is a functional block diagram of a control circuit employed in the camera of FIG. 10.

FIG. 11 shows a block diagram of a control/drive circuit for a driving mechanism, employed in this-camera, to compensate or correct the blur. Each of actuator driving circuits 1, 2 shown in FIG. 11 is, more specifically, constructed as shown in FIGS. 6 and 7.

Figure 2:
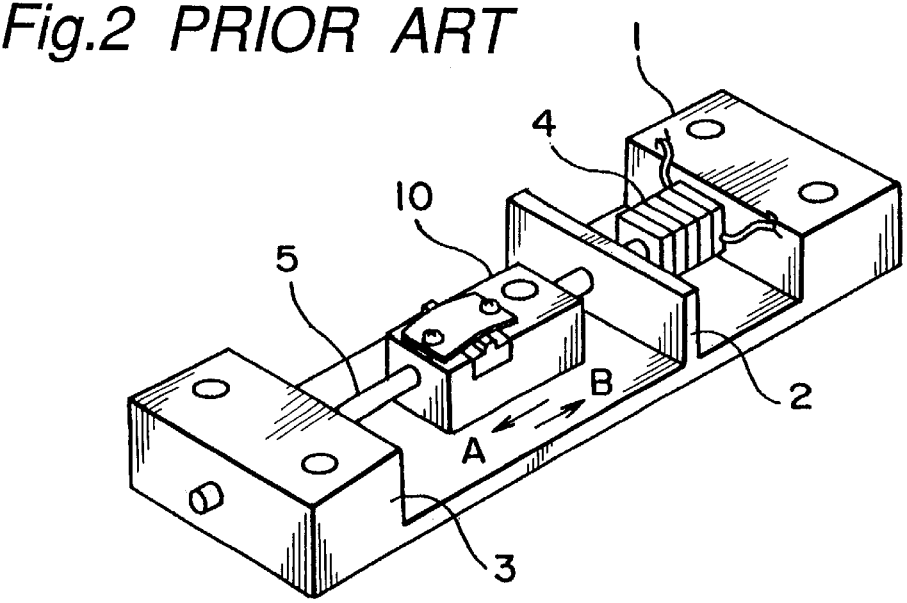
FIG. 2 is a perspective view of the actuator of FIG. 1 when it is assembled.
Figure 3:
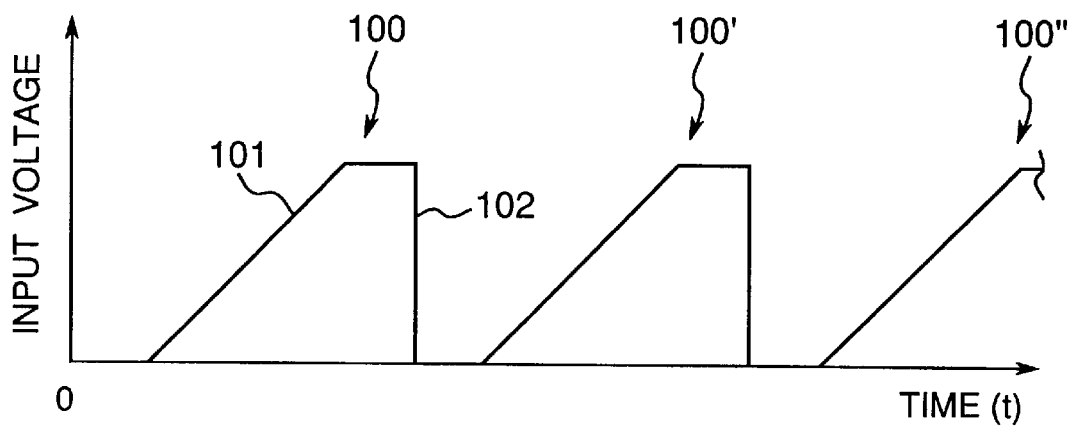
FIG. 3 is a graph showing a driving pulse voltage for driving the actuator of FIG. 1.
Figure 6:
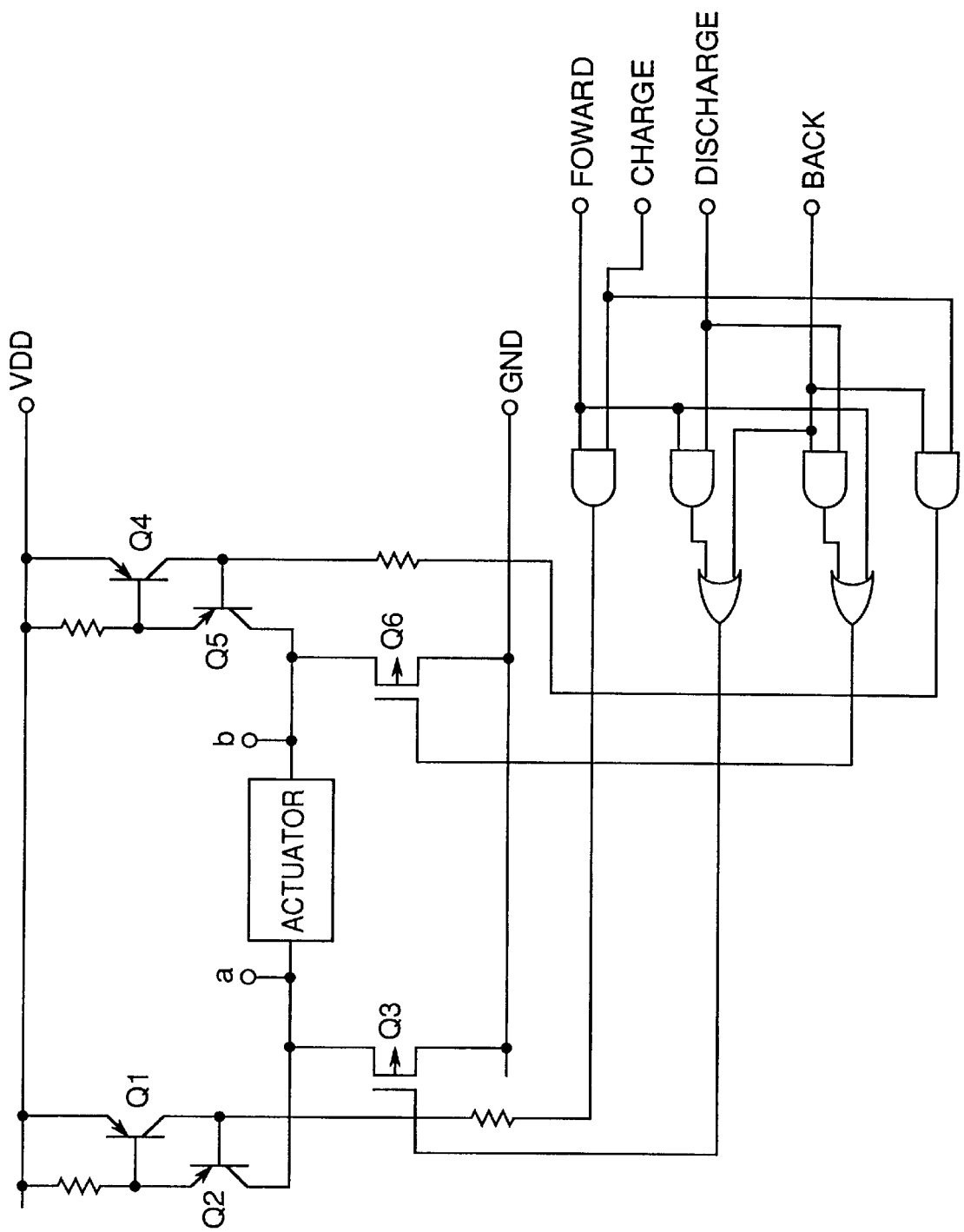
FIG. 6 is a circuit diagram for driving the actuator of FIG. 4.
Figure 7:
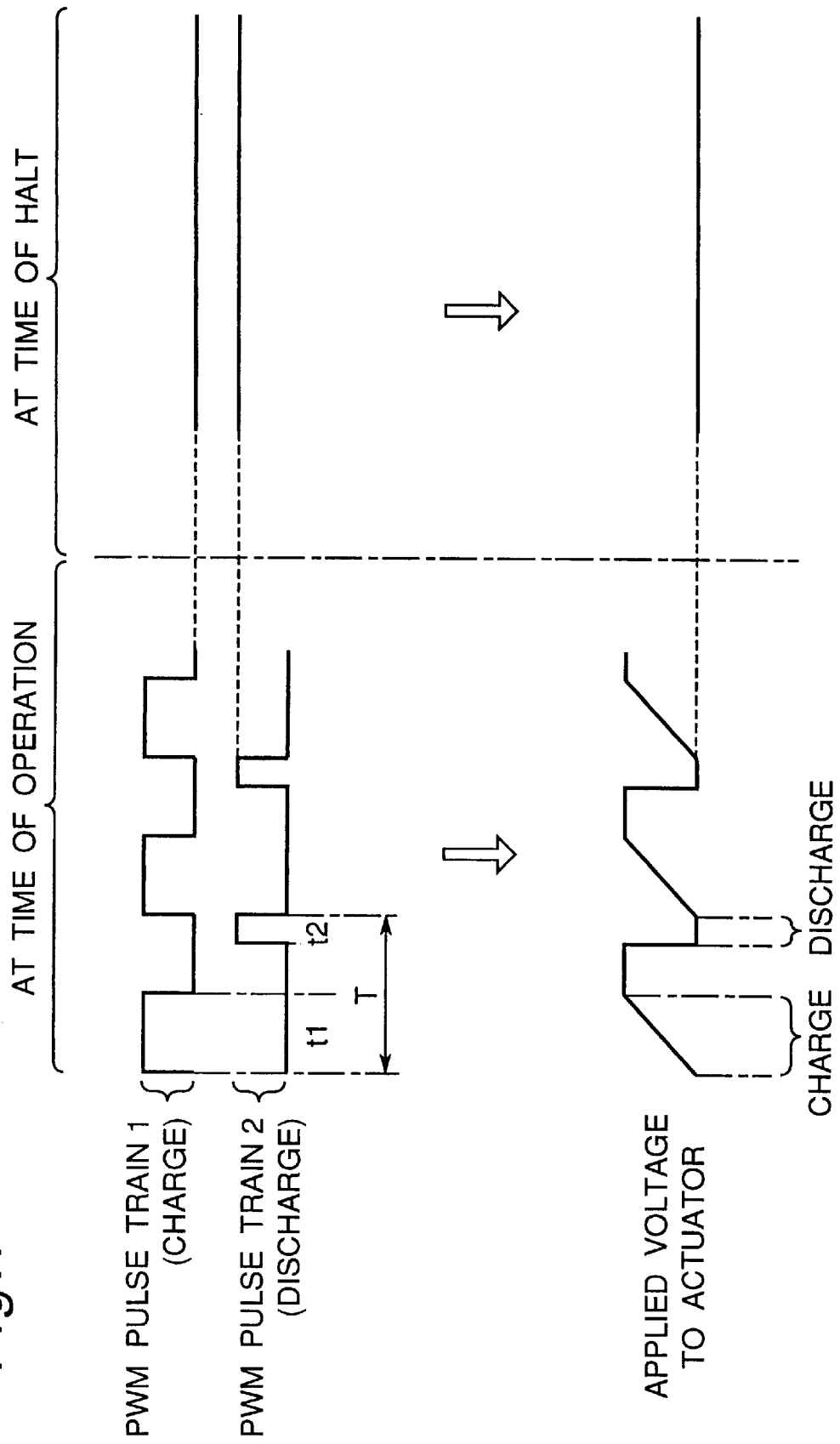
FIG. 7 is an explanatory view of an PWM (i.e. pulse-width modulation) pulse train, as an example which has been suggested, to be supplied to an actuator.
Figure 8:
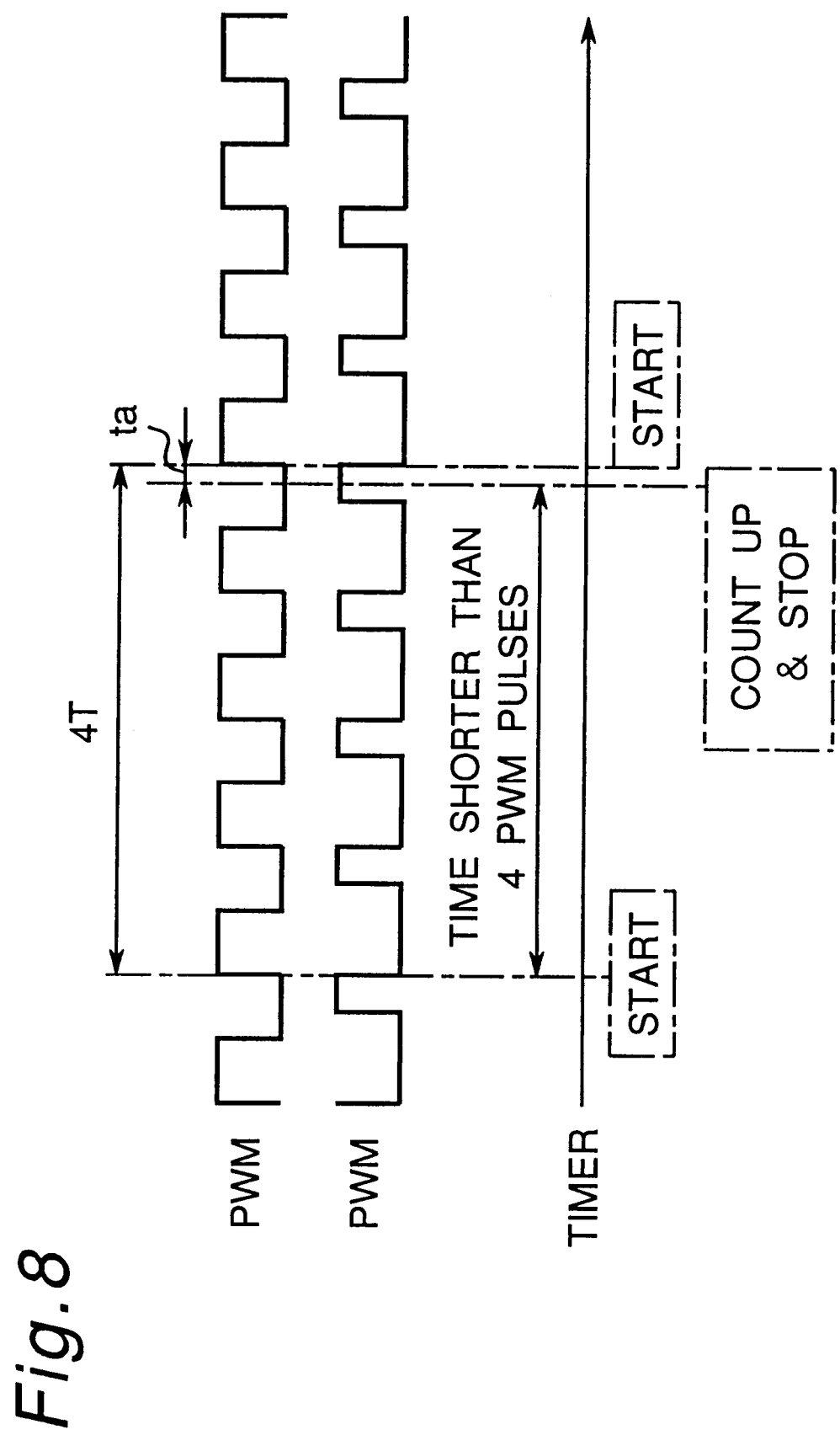
FIG. 8 is an explanatory view to explain how to keep a feedback cycle constant without employing the PWM pulse train.
Figure 9:
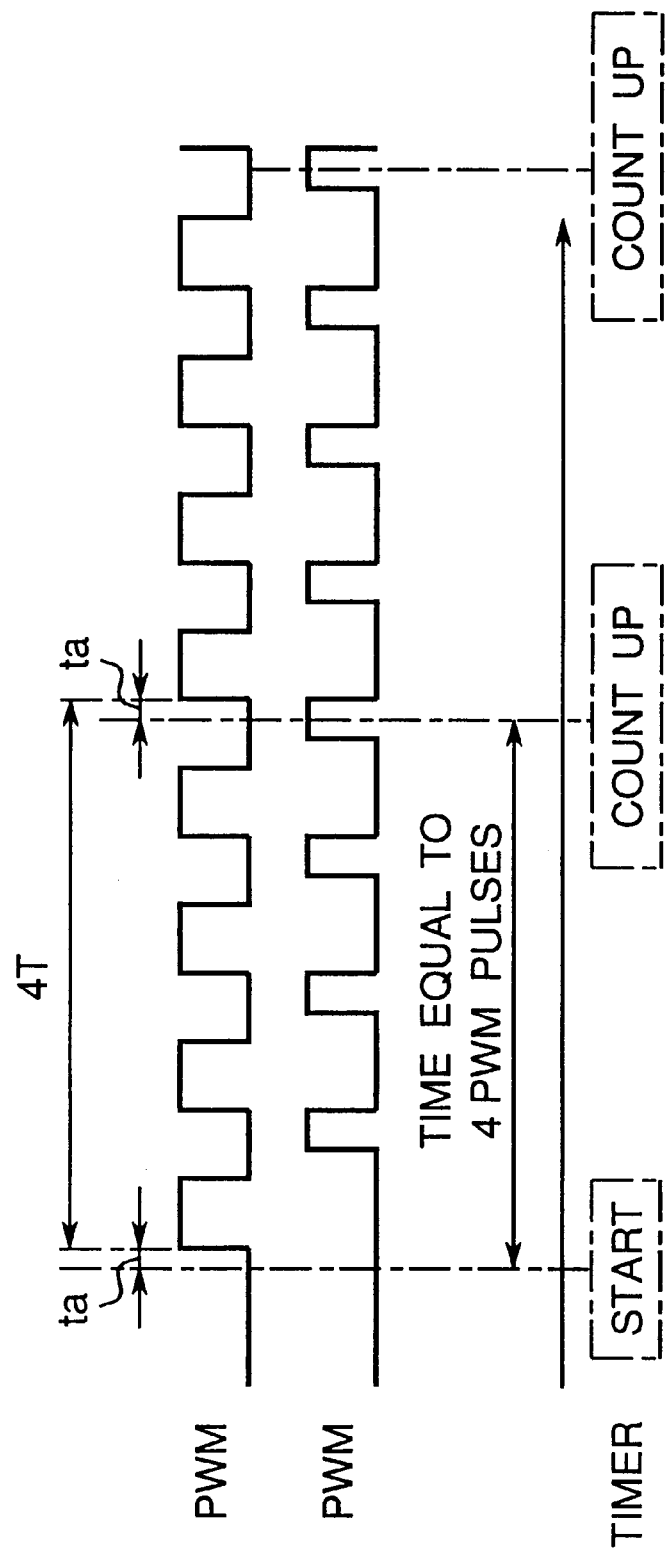
FIG. 9 is an explanatory view, as another example, to explain how to keep a feedback cycle constant without employing the PWM pulse train.

That is, when the control/drive circuit of the embodiment as shown in the block diagram of FIG. 11 is applied to the actuator as shown in FIGS. 1 and 2, when a lens frame for holding a lens or lens unit of the camera of the embodiment is connected to the moving body 10, and when the moving body 10 is moved forward (in a direction shown by an arrow "A" in FIG. 2), a "FORWARD" terminal as shown in FIGS. 6 and 11 is continuously supplied with a 'high' signal; a "BACK" terminal is continuously supplied with a 'low' signal; a "CHARGE" terminal is supplied with a "PWM PULSE TRAIN 1" as shown in FIG. 7; and a "DISCHARGE" terminal is supplied with a "PWM PULSE TRAIN 2".

By the way, the "PWM PULSE TRAIN 1" as shown in FIG. 7 is such a pulse train as being modulated into one with a pulse width which corresponds to a lens driving speed being required to cancel an amount of the aforementioned blur, namely to cancel a hand-shake amount, measured by a hand-shake measuring sensor. Meanwhile, the "PWM PULSE TRAIN 2" has a predetermined constant pulse width.

When the "FORWARD" terminal is continuously supplied with the 'high' signal, a switch constituted by a transistor "Q6" is closed. Therefore, it causes a point of "b" to be grounded. Under this state, when the "PWM PULSE TRAIN 1" fed to the "CHARGE" terminal becomes the 'high' signal, a constant current circuit (or a charging circuit part) constituted by a pair of transistors "Q1" and "Q2" is closed. Therefore, it causes the voltage of a point of "a" to slowly increase so that the piezoelectric element 4 expands slowly.

On the other hand, when the "PWM PULSE TRAIN 1" fed to the "CHARGE" terminal becomes the 'low' signal, the constant current circuit is opened. Therefore, the voltage of the point of "a" does not increase.

When the "PWM PULSE TRAIN 2" fed to the "DISCHARGE" terminal becomes the 'high' signal, a switch (or a discharge circuit part) constituted by a transistor "Q3" is closed. Therefore, it causes the electric charge stored or accumulated at the point of "a" to abruptly flow out. Consequently, the voltage of the point of "a" abruptly lowers, causing the piezoelectric element 4 to abruptly contract.

That is, the moving body 10 can be driven in the direction shown by the arrow "A" relative to the base seat 1 as shown in FIG. 2, by feeding the "PWM PULSE TRAINS 1 and 2" to the "CHARGE" terminal and the "DISCHARGE" terminal respectively at specified timings, as shown in FIG. 7.

In this operation, a moving speed of the moving body 10 depends upon a duty ratio (t1/T) of the "PWM PULSE TRAIN 1". That is, because a period "T" is maintained at a constant preset value, a charging amount (i.e. an expansion amount of the piezoelectric element 4) during the time "T" can be controlled by changing "t1" in response to the shaking amount measured, and therefore the moving speed of the moving body 10 can be controlled. By the way, the duty ratio (t2/T) of the "PWM PULSE TRAIN 2" is kept constant at a predetermined value.

On the other hand, when the moving body 10 is moved backward in a direction shown by an arrow "B" in FIG. 2, the "FORWARD" terminal as shown in FIGS. 6 and 11 is continuously supplied with a 'low' signal; the "BACK" terminal is continuously supplied with a 'high' signal; the "CHARGE" terminal is supplied with the "PWM PULSE TRAIN 1" with the same cycle "T" as shown in FIG. 7; and the "DISCHARGE" terminal is supplied with the "PWM PULSE TRAIN 2" with the same cycle "T" as well.

Under the situation, when the "PWM PULSE TRAIN 1" fed to the "CHARGE" terminal becomes the 'high' signal, a constant current circuit (i.e. a charge circuit part) constituted by a pair of transistors "Q4" and "Q5" is closed. Therefore, an electric charge opposite the electric charge employed at time of the forward movement of the moving body 10, is stored or accumulated slowly at the point 'b'. Accordingly, the piezoelectric element 4 contracts slowly.

Meanwhile, when the "PWM PULSE TRAIN 2" fed to the "DISCHARGE" terminal becomes the 'high' signal, the switch (or the discharge circuit part) constituted by a transistor "Q6" is closed. Therefore, it causes the electric charge stored or accumulated at the point of "b" to abruptly flow out. Consequently, the voltage of the point of "b" abruptly lowers, causing the piezoelectric element 4 to abruptly expand.

On the other hand, in order to keep the moving body 10 stationary relative to the base seat 1, there's no need to supply pulses to the "CHARGE" terminal and the "DISCHARGE" terminal.

As described above, the camera of the preferred embodiment has a construction by which the possible handshake-caused blur around the pitch axis "P" and/or the yaw axis "Y", caused at time of handing the camera, of image formed in the optical system therein, is compensated or corrected. For realizing this function, there are provided a pair of separate driving circuits (i.e. "ACTUATOR DRIVING CIRCUIT 1" and "ACTUATOR DRIVING CIRCUIT 2") for driving a pair of separate actuators to compensate or correct the possible blur, as is well shown in FIG. 11.

Figure 12:
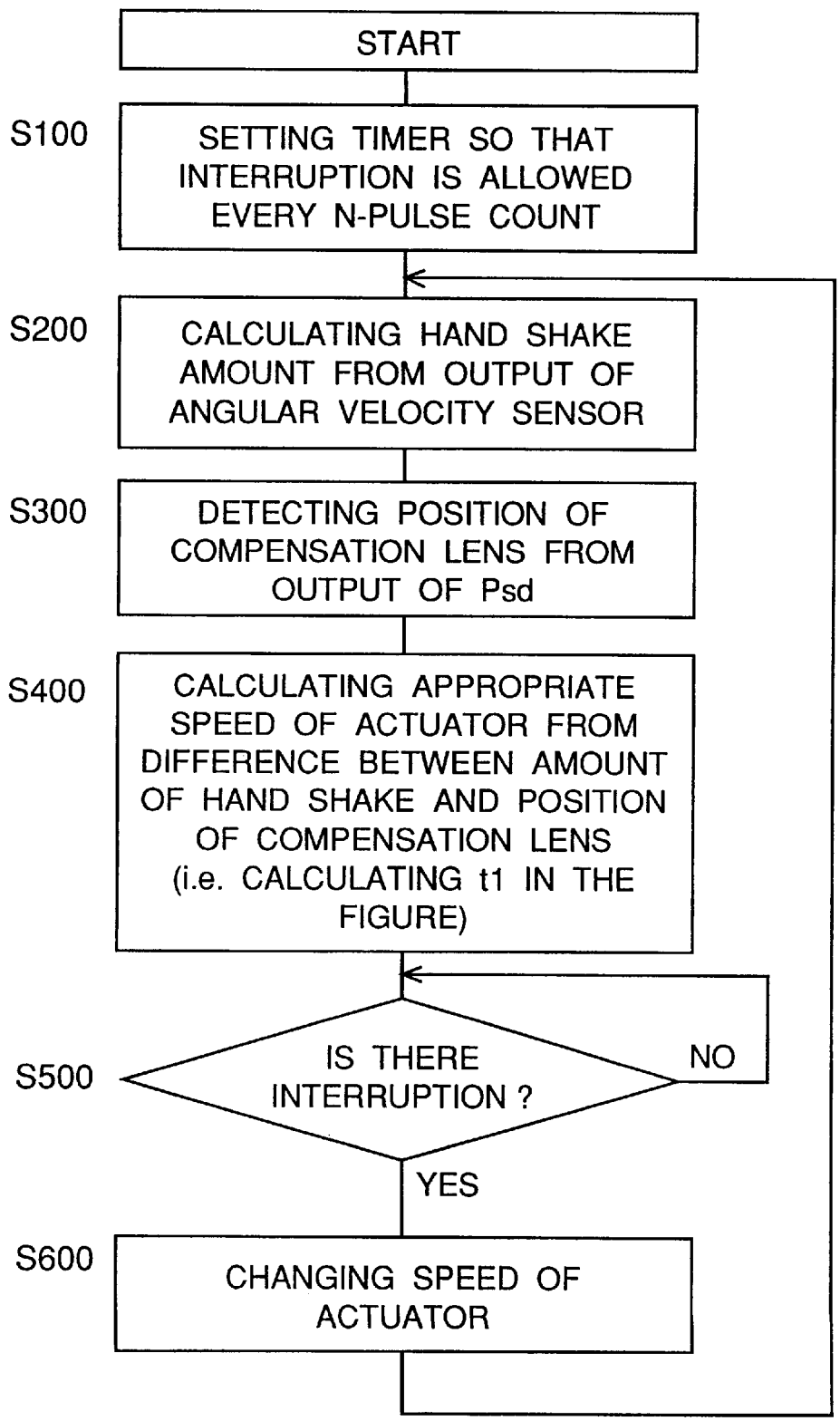
FIG. 12 is a flow chart for explaining how the driving mechanism of the camera of FIG. 10 is controlled.

Next, referring to the functional block diagram shown in FIG. 11, to a flow chart shown in FIG. 12 and to FIG. 13, an explanation is made below upon how the driving mechanism of the camera of the preferred embodiment is controlled.

First, at step S100, a feedback cycle or period is set in terms of the number of pulses in the "PWM PULSE TRAIN 2". As will be described later, the "PWM PULSE TRAIN 2" is continuously output with a specified constant cycle "T". Therefore, the constant feedback period (i.e. a specified number times "T") can be determined by determining the number of pulses therein. By the way, it is preset that the counting of the number of pulses is performed at the same time as a leading edge of a pulse appears. In this arrangement, the time corresponding to one pulse (i.e. the time corresponding to "t2" in FIG. 13) can be utilized for executing the feedback operation. Generally speaking, the time necessary for executing the feedback operation is far shorter than the time corresponding to one pulse. Therefore, the above arrangement allows to secure enough time to let the feedback operation be carried out.

Within the camera shown in FIG. 10, are installed an "ANGULAR VELOCITY SENSOR 1" and a "Psd 1" (Position sensor device) for measuring angular velocity and lens position around the pitch axis "P", and an "ANGULAR VELOCITY SENSOR 2" and a "Psd 2" for measuring angular velocity and lens position around the yaw axis "Y".

Each of the "ANGULAR VELOCITY SENSORS 1 and 2", which is electrically connected to a microcomputer of the camera, outputs a measured angular velocity as a voltage to each of the "a/d" terminals (i.e. "a/d1" and "a/d2" in FIG. 11) of the microcomputer. The microcomputer samples the voltage with a specified constant period, where the amount (angle) of hand shake of the camera around each of the pitch axis "P" and the yaw axis "Y" is calculated from the angular velocity by an integrating operation at step S200.

Meanwhile, each of the "Psd 1" and "Psd 2" is also electrically connected to the microcomputer, and each thereof outputs the detected lens position as a voltage to each "a/d" terminal (i.e. "a/d3" and "a/d4" in FIG. 11) of the microcomputer. The microcomputer samples the voltage with a specified constant period, as well, at step S300.

Figure 13:
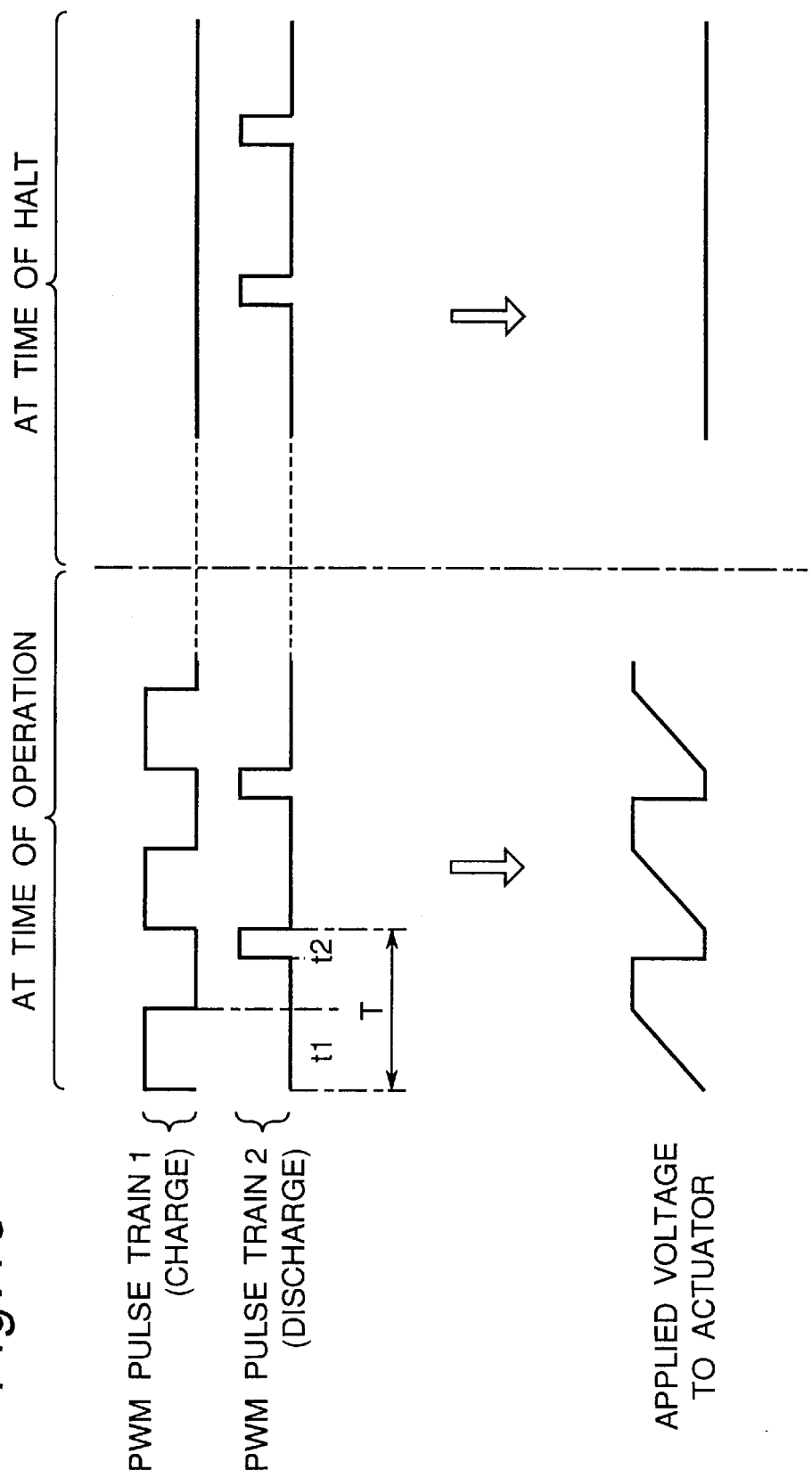
FIG. 13 is an explanatory view for explaining a pair of PWM pulse trains employed to control the driving mechanism of the camera of FIG. 10.

Next, comparing the hand-shake amount (or the hand-shake angle) with the lens position inside the camera, a lens-moving amount required for correcting or compensating the blur thereof is determined; at the same time, a necessary driving speed of the lens (i.e. the moving speed of the moving body 10, or the length of "t1" shown in FIG. 13) is calculated on a basis or the lens-moving amount at step S400. In this way, the necessary speed for driving the lens is sought and calculated periodically. By the way, the more the moving amount of the lens is, the greater the necessary driving speed of the actuator is. As apparent from the aforementioned explanation, in the preferred embodiment shown in the figures, the hand-shake amount to be corrected is determined by the "ANGULAR VELOCITY SENSORS 1 and 2", and the "Psd 1 and Psd 2".

The actuator is driven with the necessary driving speed which is calculated for the first time after the feedback control starts, and an interruption by the timer is awaited at step S500.

When the interruption occurs at step S500, the particular time corresponding to the aforementioned specified feedback cycle has elapsed. In this case, the program proceeds to step S600 where the actuator driving speed is changed, and then the program returns to the steps S200 through S400 again in order to repeat the same operation.

FIG. 13 shows a plurality of pulses that belong to both the "PWM PULSE TRAIN 1" and the "PWM PULSE TRAIN 2" respectively which are fed to the actuator (i.e. piezoelectric element 4), and that are employed for driving/stopping the actuator.

First, the following discussion provides an explanation for a case in which the piezoelectric element 4 is driven.

As shown in FIG. 11, each of a "p1" terminal and a "p2" terminal on the microcomputer is electrically connected to each of the "CHARGE" terminals of the "ACTUATOR DRIVING CIRCUITS 1 and 2" respectively, in which each of the "PWM PULSE TRAINS 1 and 1" corresponding to the driving speeds calculated for driving the individual actuators is output to each of the "CHARGE" terminals of the "ACTUATOR DRIVING CIRCUITS 1 and 2". The "PWM PULSE TRAIN 1" shown in FIG. 13 is a PWM pulse train to be fed to either one of the actuator driving circuits 1 and 2. On the other hand, the "PWM PULSE TRAIN 2" as shown in FIG. 13 is fed to the "DISCHARGE" terminals of the "ACTUATOR DRIVING CIRCUITS 1 and 2", in which the "PWM PULSE TRAIN 2" has the same cycle as that of the "PWM PULSE TRAIN 1".

That is, in the same way as the "PWM PULSE TRAINS 1 and 2" with the same cycle at time of driving the actuator as shown in FIG. 7, the "PWM PULSE TRAINS 1 and 2" with the same cycle "T" are respectively supplied to the "CHARGE" terminal and the "DISCHARGE" terminal of each of the "ACTUATOR DRIVING CIRCUITS 1 and 2" at specified timing, by which the actuator is driven so that the blur thereof due to the hand shaking is corrected or compensated. By the way, each of the actuators, although not shown, is controlled in the same manner.

Next, an explanation is provided below for a case in which the actuator is stopped.

In the example shown in FIG. 7, the "PWM PULSE TRAIN 2" is not supplied to the "DISCHARGE" terminal while the actuator is not driven. In contrast with this operation, the "PWM PULSE TRAIN 2" shown in FIG. 13 is continuously supplied to the discharge terminal, not only while the actuator is driven, but also while the actuator is not driven.

That is, as shown in FIG. 13, each driving cycle "T" of the actuator comes to an end with a state in which the "PWM PULSE TRAIN 2" (i.e. the pulse train fed to the "DISCHARGE" terminal) that commands the discharge of the electric charge is in the 'high' signal. This means that the electric charge is not stored or accumulated when the actuator is not driven or is stopped. Therefore, even if the "PWM PULSE TRAIN 2" (i.e. the pulse which is output during the time "t2" in FIG. 13) that commands the discharge is output from the microcomputer with a state that there is not stored the electric charge therein, the actuator is not operated. In other words, even if the "PWM PULSE TRAIN 2" is continuously output at the time-to stop the actuator, there does not occur such a disadvantageous situation such that the actuator starts operating.

As apparent from the above description, according to the embodiment, the "PWM PULSE TRAIN 2" is continuously fed to the "DISCHARGE" terminal of each of the "ACTUATOR DRIVING CIRCUITS 1 and 2", even when the actuator is stopped or is not driven; and the feedback cycle for controlling the driving mechanism is kept constant by counting the number of pulses of the "PWM PULSE TRAIN 2" (e.g. 4 pulses).

With this arrangement, the control program for controlling the driving mechanism of the camera is simplified, so that the burden on the microcomputer is effectively reduced.

The above arrangement and/or method to control the driving mechanism may be applied to a camera in which there is installed only one single actuator for driving a correcting or compensating lens. More advantageously, the above arrangement and/or method to control the driving mechanism can be applied to the camera, like one according to the preferred embodiment, in which there are installed two actuators in the driving mechanism as explained above.

Figure 14:
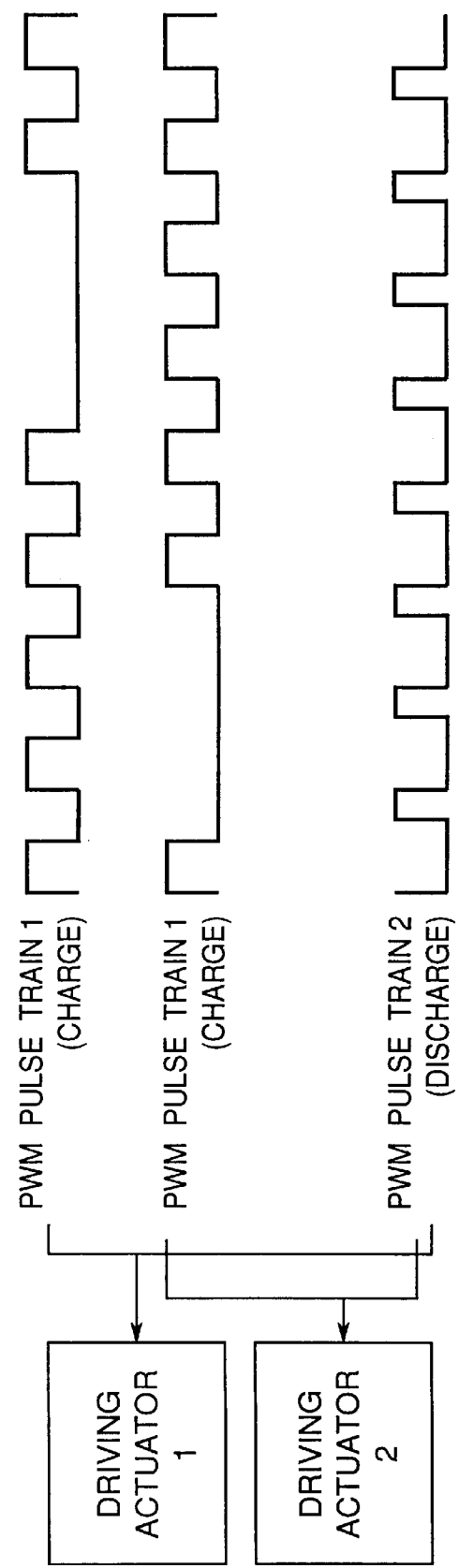
FIG. 14 is an explanatory view for explaining a plurality of PWM pulse trains employed to control a pair of actuators which are installed in a camera according to another modification to the embodiment.

That is, the "PWM PULSE TRAIN 2" to be fed to the "DISCHARGE" terminal is continuously output no matter whether the actuator is operating or not. Therefore, as a modification to the embodiment, in case that there are installed two driving actuators, as shown in FIG. 14, one single "PWM PULSE TRAIN 2" can be shared between the two driving actuators. In this case, of course, it is necessary to synchronize the cycle of one of the "PWM PULSE TRAINS 1" with the cycle of the other thereof.

Figure 15:
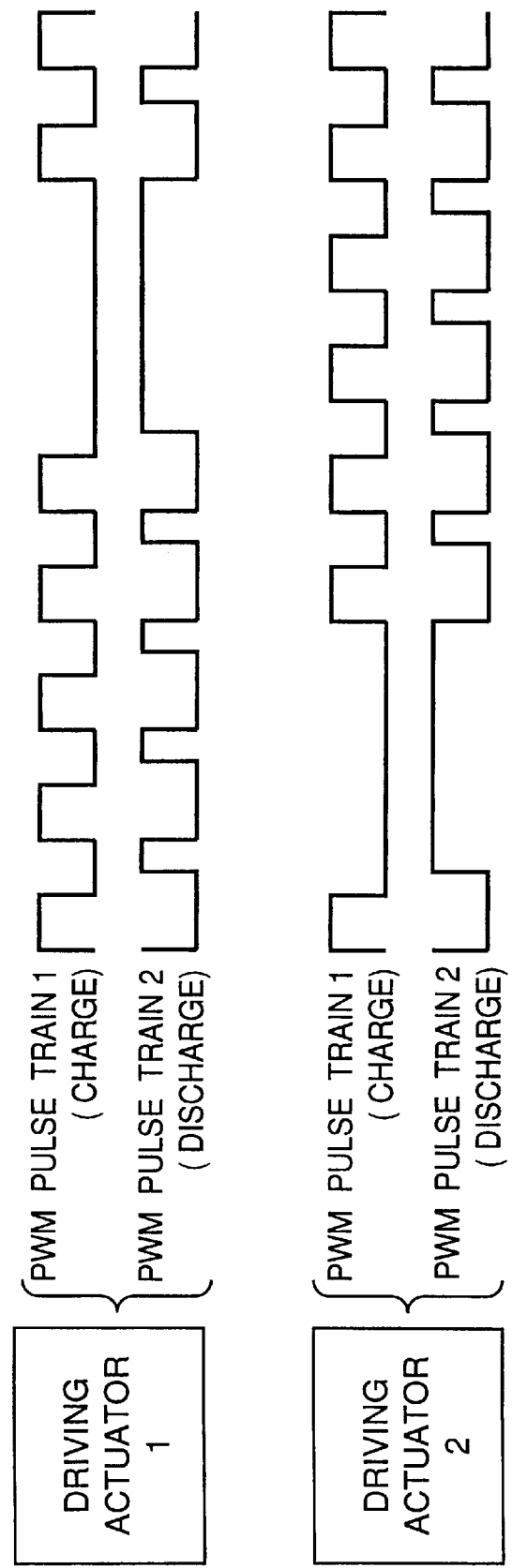
FIG. 15 is an explanatory view to explain how to control a pair of actuators with a plurality of PWM pulses, as another example which has been suggested.

Namely, in case that there are provided a pair of driving actuators and a pair of actuator driving circuits each of which is so constructed that the "PWM PULSE TRAIN 2" is not fed when the actuator is not driven, it is necessary to output a pair of separate "PWM PULSE TRAINS 2" for driving the pair of "DRIVING ACTUATORS 1 and 2", as shown in FIG. 15. Also, in case that there are provided more than two driving actuators and more than two actuator driving circuits each of which is so constructed that the "PWM PULSE TRAIN 2" is not fed when the actuator is not driven, it is necessary to output more than two separate "PWM PULSE TRAINS 2", namely necessary to output the number, equal to the number of the driving actuators, of the separate "PWM PULSE TRAINS 2", for driving the driving actuators.

In other words, no matter how many driving actuators are installed inside the camera, there is no need of more than one "PWM PULSE TRAIN 2". Namely, it is possible to simplify a wiring of the control circuit and the control program employed therein, which in turn simplifies the overall construction of the driving mechanism of the camera.

As can be seen from the functional block diagram shown in FIG. 11, there are mounted two "ACTUATOR DRIVING CIRCUITS 1 and 2" i.e. two driving actuators; however, a common "PWM PULSE TRAIN 2" is fed from a single "p3" terminal of the microcomputer to the "DISCHARGE" terminal of each of the "ACTUATOR DRIVING CIRCUITS 1 and 2". With the arrangement, the timer keeps the feedback cycle constant by counting the number of pulses of this "PWM PULSE TRAIN 2" output from the "p3" terminal of the microcomputer.

Figure 4:
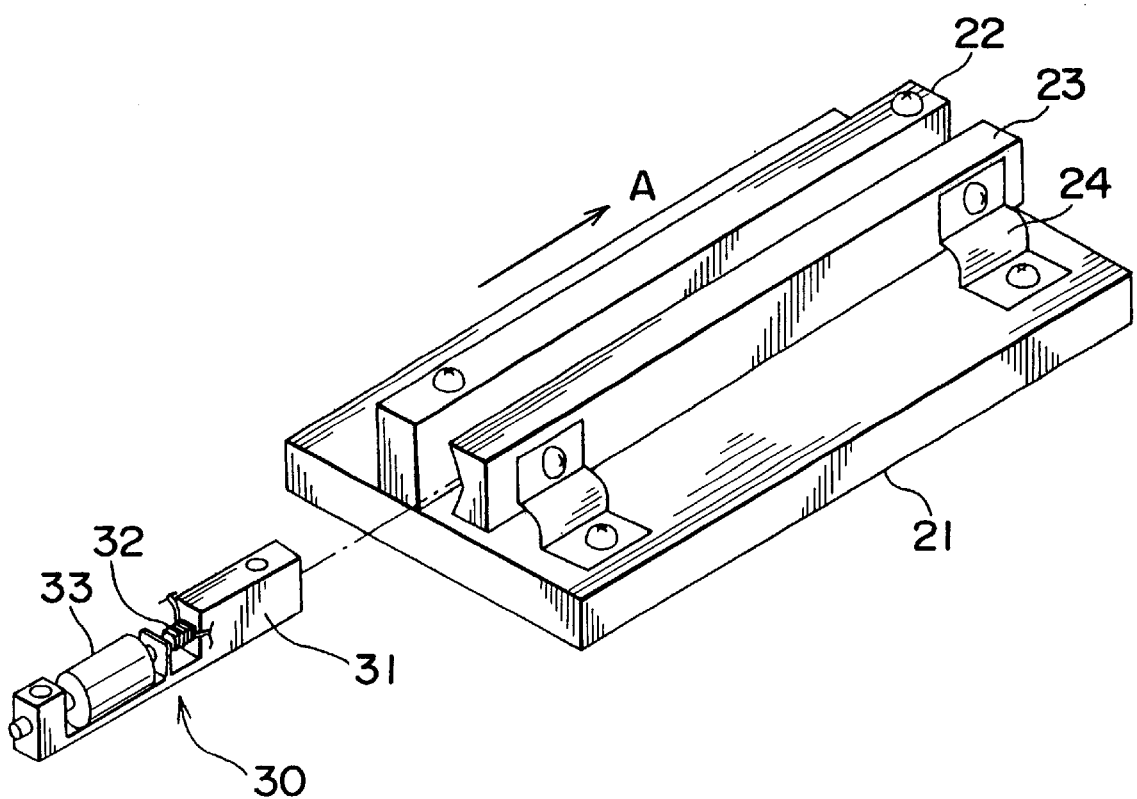
FIG. 4 is an exploded perspective view of an actuator employing a piezoelectric element in a driving mechanism which is provided in a camera according to a modification to a preferred embodiment of the present invention.
Figure 5:
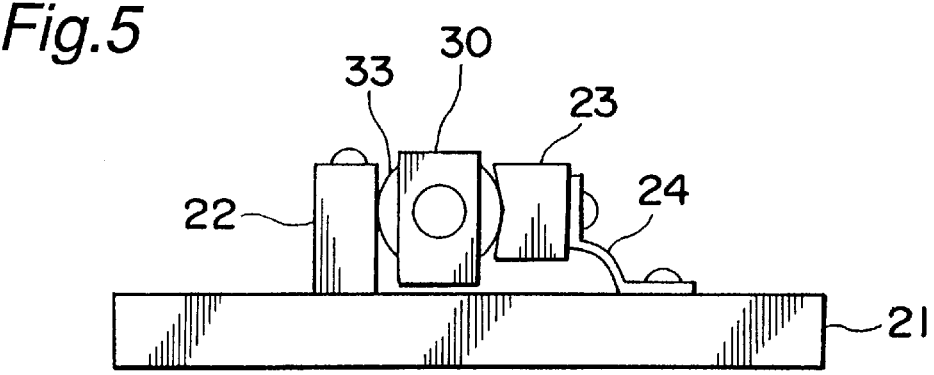
FIG. 5 is a front view of the actuator of FIG. 4 when it is assembled.

Next, referring to FIGS. 4 and 5, it is explained about a camera in which there is installed another type of driving mechanism with an actuator, employing a piezoelectric element as well, according to still another modification to the embodiment.

The figures show a self-propelled type of actuator. As shown there, the actuator has a base seat 21, a narrow long wall portion 22 which is directly fixed onto the base seat 21, and a pressing member 23 which is attached to the base seat 21. The narrow long wall portion 22 and the pressing member 23 constitute a pair of rails within which a driving unit 30 runs by itself.

The driving unit 30 has a moving body 31 with a relatively large mass and a driving shaft 33 with a relatively small mass, in which the moving body 31 and the driving shaft 33 are arranged in series with a piezoelectric element 32 being sandwiched therebetween. While the wall portion 22 is fixed directly to the base seat 21, the pressing member 23 is fixed to the base seat 21 via a support spring 24. The driving shaft 33 of the driving unit 30 is pressed and supported between the pair of rails with a specified frictional force.

With the arrangement of the actuator, when the piezoelectric element 32 expands slowly, the moving body 31 moves between the rails relative to the base seat 21 while the driving shaft 33 remains stationary relative thereto. On the other hand, when the piezoelectric element 32 contracts abruptly, the driving shaft 33 slides between the rails against the frictional force exerting therebetween while the moving body 31 remains stationary, or almost stationary, relative to the rails and the base seat 21.

Accordingly, like the moving body 10 of the actuator shown in FIGS. 1 and 2, not only the driving unit 30 can be moved within the rails relative to the base seat 21, but also the direction in which the driving unit runs can be freely changed, by controlling the voltage supplied to the piezoelectric element 32.

It has been explained above about the embodiment of the camera to which the present invention is applied. However, the present invention is not limited to the embodiment. For example, the present invention can be applied to any type of driving mechanism, apparatus including an optical apparatus in which the driving mechanism is provided, and method for controlling the driving mechanism.

Although the present invention has been fully described in connection with the preferred embodiment and the modifications to the embodiment thereof with referece to the accompanying drawings, it is to be noted that other various changes and modifications are also apparent to those skilled in the art. Such changes and modifications are to be understood as included within the scope of the present invention as defined by the appended claims unless they depart therefrom.

What is claimed is:

1. A driving mechanism in which an actuator is driven by a plurality of pulses of pulse-width modulation, comprising:

a counter for counting a number of said pulse-width modulation pulses; and a feedback circuit for executing a feedback on an operation of the actuator with a cycle which is determined on a basis of the number of the pulses counted by the counter.

2. A driving mechanism as claimed in claim 1, wherein the plurality of pulses of pulse-width modulation are pulses with at least two phases, wherein the pulses with one of the at least two phases are kept outputting regardless of the operation of the actuator, and wherein the counter counts the number of the pulses with the one of the at least two phases.

3. A driving mechanism as claimed in claim 2, wherein the actuator comprises an electromechanical transducer which expands and contracts when the pulses with the at least two phases are supplied to the electromechanical transducer from a pulse generator for generating the pulses.

4. A driving mechanism as claimed in claim 1, wherein the actuator comprises an electromechanical transducer which expands and contracts when the pulses are supplied to the electromechanical transducer from a pulse generator for generating the pulses.

5. An apparatus, comprising:

a pulse generator for providing a plurality of pulses of pulse-width modulation;

an actuator which is driven by the plurality of pulses thereof;

a counter for counting a number of said pulse-width modulation pulses thereof; and a controller for executing a feedback on a provision of the pulses to the actuator with a cycle which is determined on a basis of the number of the pulses counted by the counter.

6. An apparatus as claimed in claim 5, wherein the plurality of pulses of pulse-width modulation are pulses with at least two phases, wherein the pulses with one of the at least two phases are kept outputting regardless of an operation of the actuator, and wherein the counter counts the number of the pulses with the one of the at least two phases.

7. An apparatus as claimed in claim 6, wherein the actuator comprises an electromechanical transducer which expands and contracts when the pulses are provided for the electromechanical transducer from the pulse generator.

8. An apparatus as claimed in claim 5, wherein the actuator comprises an electromechanical transducer which expands and contracts when the pulses are provided for the electromechanical transducer from the pulse generator.

9. A feedback control method for executing a feedback on an operation of an actuator which is driven by a plurality of pulses of pulse-width modulation, comprising the steps of:

providing the actuator with the plurality of pulses thereof;

counting a number of the plurality of pulses of said pulse-width modulation provided for the actuator; and executing a feedback on a provision of the pulses provided for the actuator with a cycle which is determined on a basis of the number of the pulses counted.

10. A feedback control method as claimed in claim 9, wherein the providing step provides the actuator with the plurality of pulses of pulse-width modulation with at least two phases, in which the pulses with one of the at least two phases are kept outputting regardless of driving and regardless of stopping of the actuator, and in which the counting step counts the number of the pulses with the one of the at least two phases.

11. An apparatus comprising:

an actuator with an electromechanical transducer which expands and contracts when a voltage is supplied to the transducer;

a driving pulse voltage generator which has:
- a charging circuit part for giving an electric potential difference of the voltage to the transducer so that the transducer expands; and
- a discharging circuit part for releasing an electric potential of the voltage accumulated in the transducer so that the transducer contracts from a state in which the transducer expands, a driven part which is driven by the actuator;

a pulse controller for controlling an expansion and a contraction of the transducer, by calculating a speed necessary for driving the driven part, by modulating a signal corresponding to the speed into a first pulse-width modulation train with a predetermined pulse cycle, by supplying the first pulse-width modulation train to the charging circuit part, and by supplying a second pulse-width modulation train with the predetermined pulse cycle to the discharging circuit part with a predetermined timing relative to the first pulse-width modulation train; and a counter for counting a number of pulses of the second pulse-width modulation train, wherein the pulses of the second pulse-width modulation train are kept outputting from the pulse controller regardless of driving and regardless of stopping of the actuator, and wherein the pulse controller executes a feedback on a provision of the pulses to the transducer with a preset cycle which is determined on a basis of the number of the pulses counted by the counter, so as to control the speed necessary for driving the driven part.

12. An apparatus as claimed in claim 11, wherein there are provided a plurality of actuators, each of which includes a respective electromechanical transducer, and wherein the pulse controller supplies a single second pulse-width modulation train which is supplied to each of the plurality of actuators.

13. An apparatus as claimed in claim 11, which is an optical apparatus.

14. An apparatus as claimed in claim 13, which is a camera, wherein the driven part is a correction lens for compensating a blur of image that is formed in an optical system, which includes the correction lens, in which the blur may occur when the camera is manually handled.

* * * * *